(12) United States Patent
Han et al.

(10) Patent No.: US 8,553,144 B2
(45) Date of Patent: Oct. 8, 2013

(54) ELECTRONIC DEVICE WITH CAMERA SHELTER

(75) Inventors: Ping Han, Shenzhen (CN); Yang-Liang Wu, Shenzhen (CN)

(73) Assignees: Hong Fu Precision Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/407,778

(22) Filed: Feb. 29, 2012

(65) Prior Publication Data

US 2013/0169862 A1    Jul. 4, 2013

(30) Foreign Application Priority Data

Dec. 30, 2011    (CN) .......................... 2011 1 0453208

(51) Int. Cl.
*H04N 5/225*    (2006.01)

(52) U.S. Cl.
USPC .......................................... 348/376; 348/373

(58) Field of Classification Search
USPC .................... 348/373–376, 207.99
See application file for complete search history.

(56) References Cited

U.S. PATENT DOCUMENTS

| D669,112 S | * | 10/2012 | Gustaveson | D16/237 |
| 2010/0102979 A1 | * | 4/2010 | Huang et al. | 340/686.1 |
| 2011/0058255 A1 | * | 3/2011 | Weiss | 359/511 |
| 2011/0099908 A1 | * | 5/2011 | Fortmann | 49/373 |

* cited by examiner

*Primary Examiner* — Sinh Tran
*Assistant Examiner* — Zhenzhen Wu
(74) *Attorney, Agent, or Firm* — Altis & Wispro Law Group, Inc.

(57) ABSTRACT

An electronic device includes a first housing defining a first hole, a second housing, a camera, and a camera shelter. The second housing includes a receiving part and a fixing part. The camera is fixed to the second housing. The camera shelter includes a body, an operation part, and a connection part. The body and the operation part are received in the receiving part. The connection part engages the fixing part to connect the camera shelter to the second housing. The body is sandwiched between the first housing and the second housing. When the operation part positions in a first position, the first hole defined in the first housing overlaps a second hole defined on the body to expose the camera. When the operation part is moved to a second position, the body of the camera shelter shelters the camera.

3 Claims, 6 Drawing Sheets

ELECTRONIC DEVICE WITH CAMERA SHELTER

BACKGROUND

1. Technical Field

The present disclosure relates to an electronic device with camera shelter, and particularly, to an electronic device with camera shelter capable of sheltering a camera of the electronic device when the camera is not used.

2. Description of Related Art

Some electronic devices, such as cell-phones, and notebook computers, may include a camera to capture pictures. However, the camera is easily controlled by a hacker. If the camera controlled by the hacker, the hacker will obtain the personal data of users by the controlled camera. Furthermore, the exposed camera is easily damaged.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
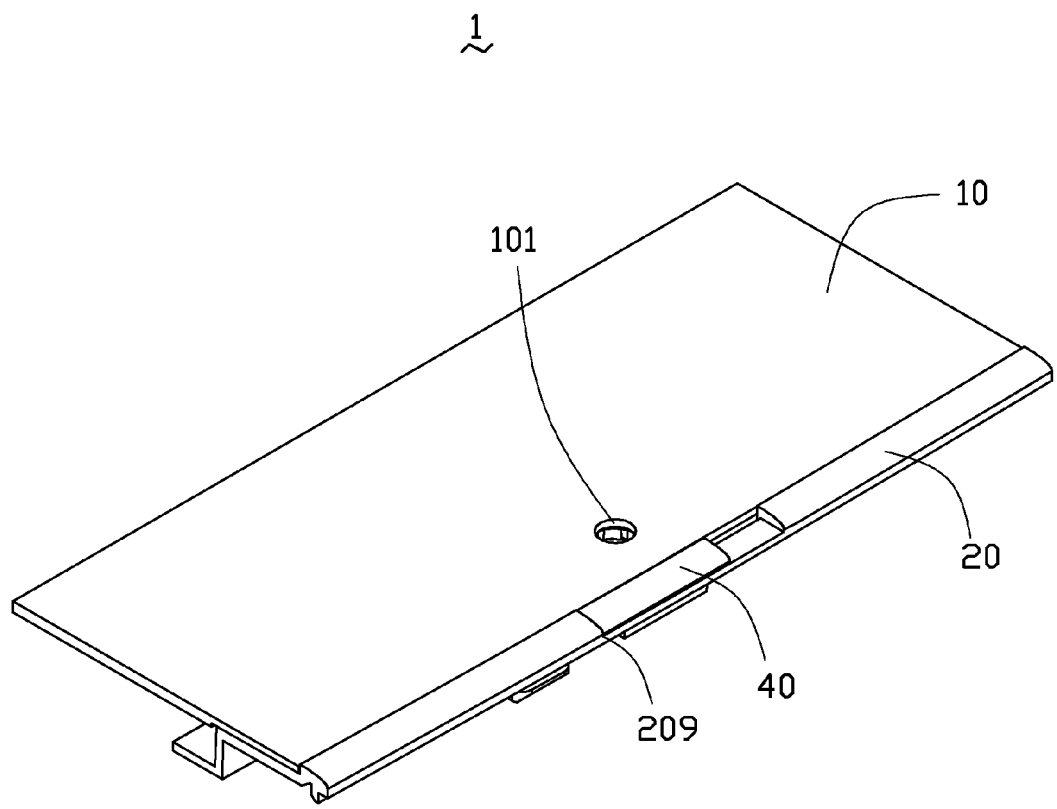
FIG. 1 is an isometric view of an electronic device with a camera shelter when a cameral shelter is operated in a first position in accordance with an exemplary embodiment.
Figure 2:
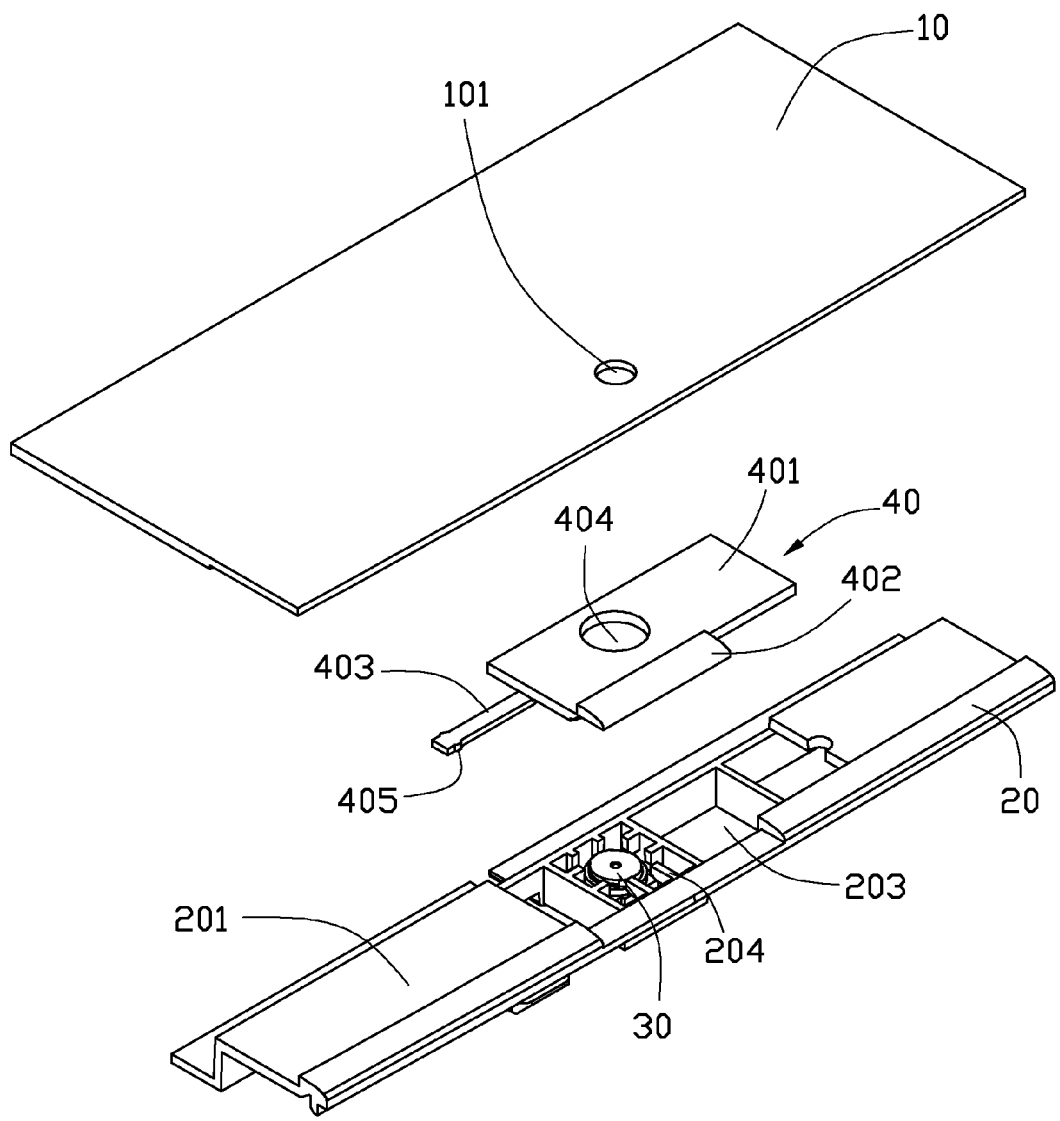
FIG. 2 is an explored view of the electronic device of FIG. 1.
Figure 3:
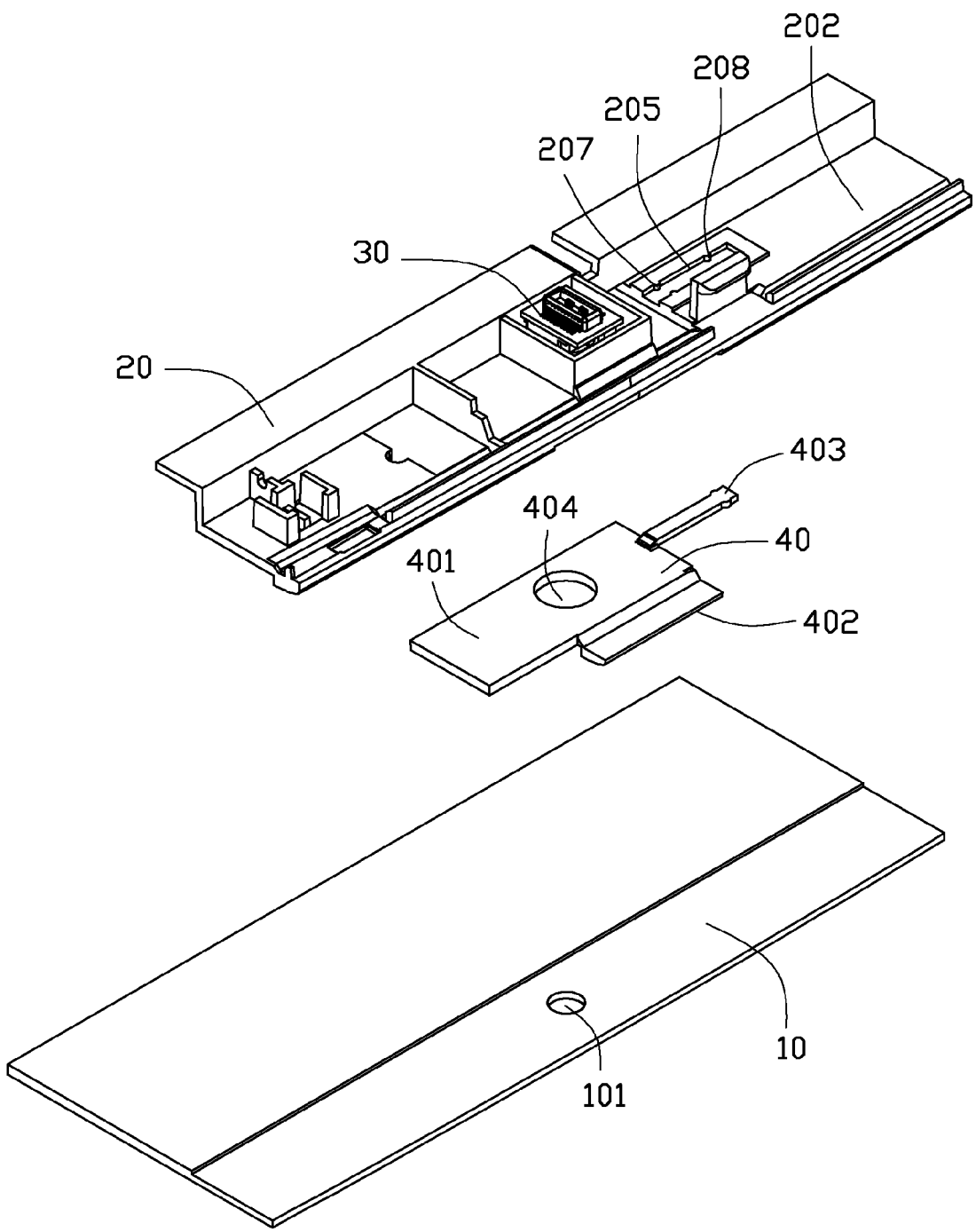
FIG. 3 is an explored view of the electronic device of FIG. 1 viewed from another perspective.

FIGS. 1-3, show an electronic device 1 including a first housing 10, a second housing 20, a camera structure 30, and a shelter 40. The first housing 10 includes a first hole 101. The second housing 20 includes a first surface 201 and a second surface 202 opposite the first surface 201. A receiving part 203 is defined on the first surface 201. The bottom of the receiving part 203 defines a camera fixing part 204 for fixing the camera structure 30. A fixing part 205 is defined on the second surface 202 for fixing the camera shelter 40. The fixing part 205 includes a first fixing element 207 and a second fixing element 208 for fixing the camera shelter 40 at two different places. In the embodiment, the fixing part 205 is a groove.

The camera shelter 40 includes a body 401, an operation part 402, and a connection part 403. The body 401 and the operation part 402 are received in the receiving part 203. The connection part 403 extends from the body 401 and engages the fixing part 205 to connect the camera shelter 40 to the second housing 20. The body 401 is sandwiched between the first housing 10 and the second housing 20. The operation part 402 is exposed in the air. The camera shelter 40 can slide along the receiving part 203.

Figure 4:
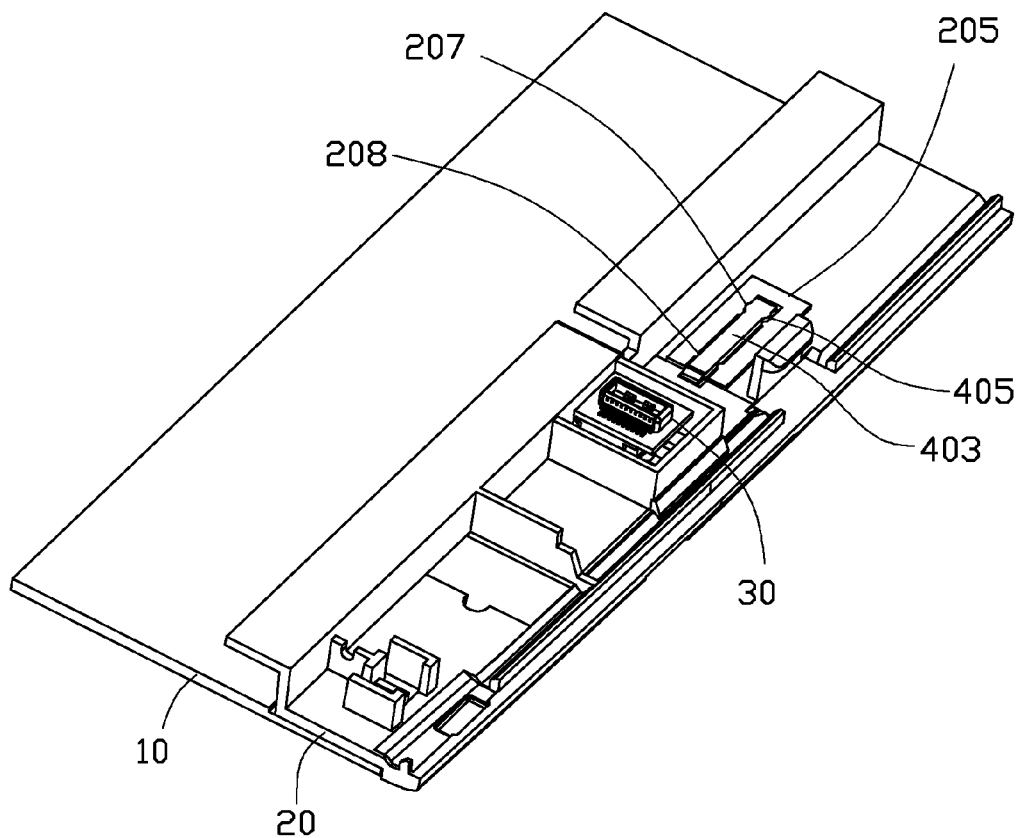
FIG. 4 is an isometric view of the electronic device of FIG. 1 viewed from another perspective.
Figure 5:
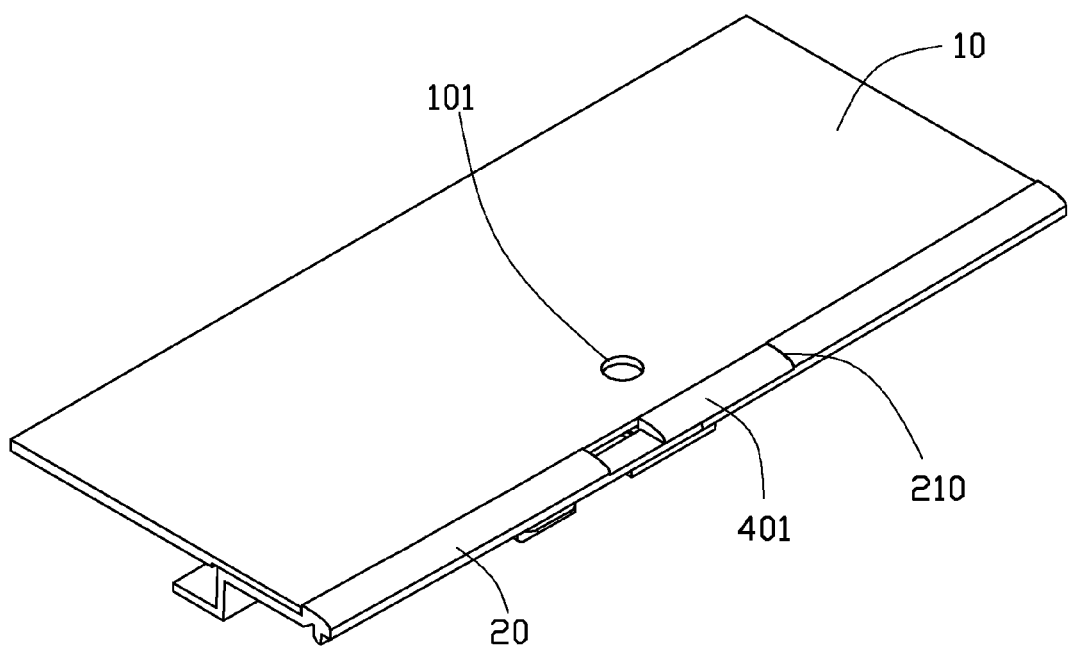
FIG. 5 is an isometric view of the electronic device of FIG. 1 when the camera shelter of the electronic device 1 is operated in a second position.
Figure 6:
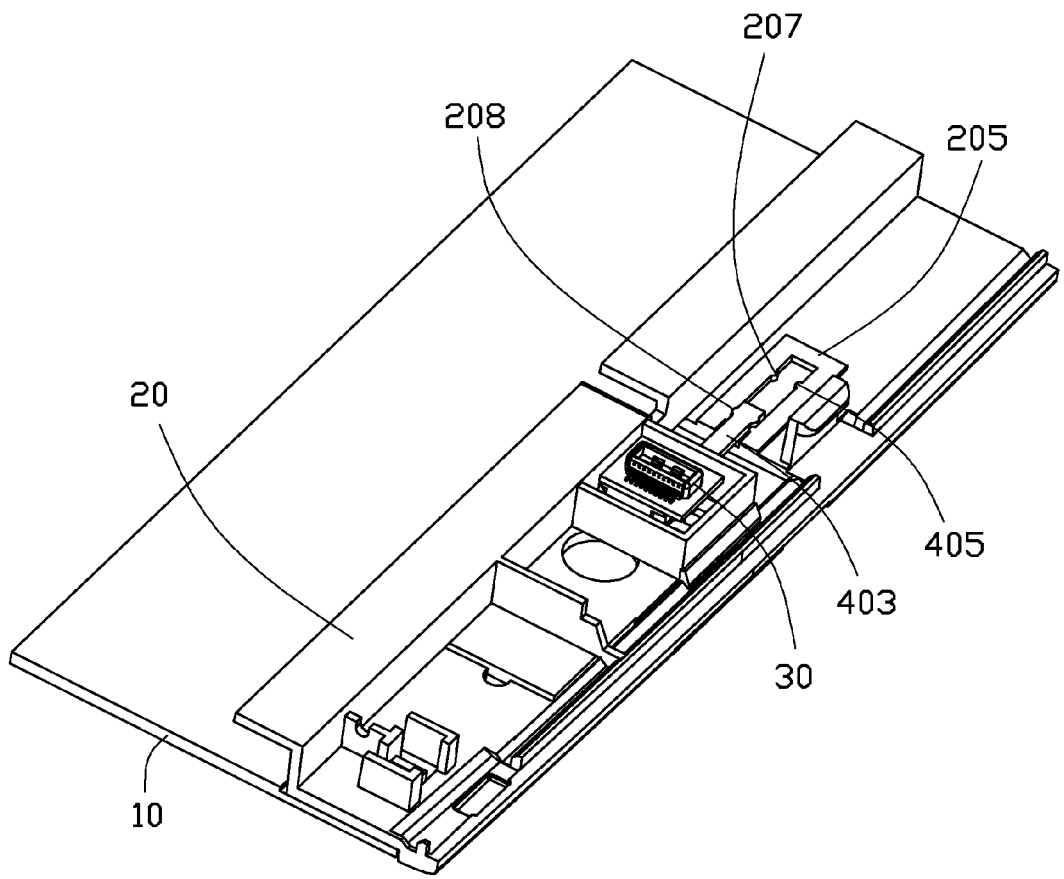
FIG. 6 is an isometric view of the electronic device of FIG. 5 viewed in another perspective.

As shown in FIG. 1, when the operation part 402 positions in a first position 209, the first hole 101 defined in the first housing 10 overlaps a second hole 404 defined on the camera shelter 40 to expose the camera structure 30, and the connection part 403 is fixed by the first fixing element 207, as shown in FIG. 4. When an external force is exerted on the operation part 402 to move the operation part 402 to a second position 210, as shown in FIG. 5, the body 401 of the shelter 40 shelters the camera structure 30 and the connection part 103 is fixed by the second fixing element 208. Accordingly, when the camera structure 30 is not used, the shelter 40 can move to shelter the camera structure 30 to protect the camera structure 30.

In the embodiment, the first fixing element 207 and the second fixing element 208 are both a pair of protrusions respectively defined at two sides of the fixing part 205. Accordingly, two sides of the connection part 403 also respectively define two protrusions 405. The connection part 403 is made of elastic material and is interference fit into the fixing part 205. When the operation part 402 positions at the first position 209, the first fixing element 207 stops the two protrusions 405 of the connection part 403 to fix the shelter 40 at the first position 209. When an external force is done on the operation part 402, the two protrusions 405 of the connection part 403 are deformed to overcome the stop of the first fixing element 204 and move to the position of the second fixing element 208 to fix the shelter 40 at the second position 210.

Although, the present disclosure has been specifically described on the basis of preferred embodiments, the disclosure is not to be construed as being limited thereto. Various changes or modifications may be made to the embodiment without departing from the scope and spirit of the disclosure.

What is claimed is:

1. An electronic device comprising:
   a first housing defining a first hole;
   a second housing comprising a receiving part and a fixing part, the fixing part comprising a first fixing element and a second fixing element;
   a camera being fixed to the second housing; and
   a camera shelter comprising a body, an operation part, and a connection part, wherein the body and the operation part are received in the receiving part, the connection part engages the fixing part to connect the camera shelter to the second housing, the body is sandwiched between the first housing and the second housing, when the operation part positions in a first position, the connection part is fixed by the first fixing element, and the first hole defined in the first housing overlaps a second hole defined on the body to expose the camera, when the operation part is moved to a second position, the connection part is fixed by the second fixing element, and the body of the camera shelter shelters the camera.

2. The electronic device as described in claim 1, wherein the connection part is made of elastic material and is interference fit into the fixing part.

3. The electronic device as described in claim 1, wherein the first fixing element and the second fixing element are both a pair of protrusions respectively defined at two sides of the fixing part, and two protrusions are also respectively defined at two sides of the connection part, when the operation part positions at the first position, the first fixing element stops the two protrusions of the connection part to fix the shelter at the first position, when an external force is exerted on the operation part, the two protrusions of the connection part are deformed to overcome the stop of the first fixing element and move to the position of the second fixing element to fix the shelter at the second position.

* * * * *